3,427,276
DISPERSIONS OF POLYMERIC ORGANIC COMPOUNDS AND PROCESS FOR MAKING THEM
Helmut Hahn, Frankfurt am Main, and Claus Beermann, Neu-Isenburg, Germany, assignors to Farbwerke Hoechst Aktiengesellschaft vormals Meister Lucius & Bruning, Frankfurt am Main, Germany, a corporation of Germany
No Drawing. Filed Nov. 7, 1966, Ser. No. 592,308
Claims priority, application Germany, Nov. 9, 1965, F 47,625
U.S. Cl. 260—32.6                8 Claims
Int. Cl. C08f 45/44, 29/16, 29/18

ABSTRACT OF THE DISCLOSURE

Organosols of high molecular weight polymers, e.g., polytetrafluoroethylene, polyethylene, polyvinyl chloride or copolymers of tetrafluoroethylene with a fluorine-containing comonomer or with vinyl acetate, having a very low water content are disclosed. The organosols may be prepared by mixing an aqueous dispersion of the polymer with formamide or a mixture of formamide with an alcohol, ether or amide having an atmospheric pressure boiling point of 150° to 350° C., and 3 to 25% by weight, based on the weight of polymer, of an nonionic or anionic surface-active agent which is soluble in water and the liquid organic phase. The water is evaporated from the mixture at a reduced pressure to yield an organosol having less than .5% water. The products are useful for casting films and impregnating paper, textiles and other materials, particularly if the materials to be coated are sensitive to water.

---

The present invention relates to a process for the manufacture of stable colloidal dispersions or organosols of polymeric organic compounds, for example, polyterafluoroethylene, polyethylene or polyvinyl chloride, having a very low water content; it relates particularly to the manufacture of stable colloidal dispersions of polymeric organic compounds in formamide or mixtures of formamide with glycol and/or mixtures of formamide with other alcohols, ethers or amines, and to the dispersions so obtained.

Such organosols can advantageously be used for making films and coatings and are suitable for use in all cases in which the presence of water is undesirable, for example in the coating of paper with polytetrafluoroethylene.

U.S. Patent 2,937,156 teaches making similar colloidal dispersions of polytetrafluoroethylene in certain alcohols, ethers or amines. However, the dispersions so obtained still contain 3 to 20% water. In the process of said patent, a mixture of an aqueous dispersion of polytetrafluoroethylene with an organic solvent containing a non-ionic emulsifier is freed to a large extent, but not completely, from water by allowing the mixture to flow down in the form of a thin film in an evacuated heated tube. By passing the mixture several times through the vacuum tube, dispersions containing at least 3% water are obtained. It is stressed in the said patent that the water content of the dispersion should be at least 3%, for complete coagulation occurs if too much water is removed from the dispersion.

For various applications, however, colloidal dispersions of a water content considerably below 3% by weight are desirable.

We have now found that stable, fluid, colloidal and substantially anhydrous dispersions of polymeric organic compounds (organosols) can be obtained by mixing an aqueous dispersion of a polymeric organic compound containing an emulsifier with formamide or a mixture of formamide with glycol and/or a mixture of formamide with a high-boiling alcohol, ether or amine, and distilling off the water in vacuo.

The present invention therefore provides a stable, fluid, colloidal dispersion consisting of (1) 1 to 70% by weight of a dispersed phase comprising a polymeric organic compound of high molecular weight which is insoluble in the liquid continuous phase, and (2) 99 to 30% by weight of a liquid continuous phase consisting of (a) at most 0.5% by weight of water, calculated on the dispersion, (b) formamide either alone or in admixture with an alcohol, ether or amine boiling at a temperature within the range of 150 to 350° C. under 760 millimeters of mercury, the said formamide mixture having a formamide content of at least 20% by weight, and (c) 3 to 25% by weight, calculated on the dispersed polymeric organic compound, of a non-ionic or anionic surface-active organic compound as dispersing agent, the latter being soluble in water and in the liquid organic continuous phase.

In accordance with the invention, such substantially anhydrous colloidal dispersions of advantageously polytetrafluoroethylene or other polymeric compounds such as polyvinyl chloride or polyethylene in formamide or mixtures of formamide with glycol or mixtures of formamide with higher alcohols, ethers or amines of the boiling range indicated above, can be obtained by concentrating a mixture of an aqueous dispersion of advantageously polytetrafluoroethylene or another polymer, having a solid content of about 1 to 70% by weight, with formamide or a mixture of formamide with glycol or a mixture of formamide with one of the other compounds indicated above, in the presence of a non-ionic or anionic surface-active substance by evaporating the water in vacuo, while stirring, until no more water passes over.

This finding could not be expected from the teaching of U.S. Patent 2,937,156. The process of the invention is limited to the use of the solvents formamide, mixtures of formamide with glycol or mixtures of formamide with alcohols, ethers or amines boiling at a temperature within the range of 150 to 350° C. under 760 millimeters of mercury, for example, glycerol, aminoethanol and diethylene glycol.

In accordance with the invention, substantially anhydrous colloidal dispersions in the aforesaid solvents are obtained by mixing a 1 to 70% by weight, advantageously 10 to 65% by weight, aqueous dispersion of a polymeric compound, advantageously polytetrafluoroethylene or polyethylene, containing 3 to 25% by weight, calculated on the solid substance, of a non-ionic or anionic emulsifier with 99 to 20% by weight of formamide or a mixture of formamide with glycol or a mixture of at least 20% of formamide with a higher alcohol, ether or amine, for example glycerol or ethanolamine, and removing substantially completely the water by evaporation under strongly reduced pressure at a temperature advantageously within the range of 50 to 70° C.

By proceeding in this manner there are obtained stable colloidal dispersions of the polymeric compounds, advantageously polytetrafluoroethylene, in the solvent or solvent mixtures containing at least 20% formamide which are to be added in accordance with the invention.

The aqueous dispersions of polytetrafluoroethylene advantageously used as starting products for the process of the invention can be obtained, for example, by the processes described in U.S. Patents Nos. 2,478,229 and 2,559,752 and Belgian Patent No. 657,648.

When other solvents are used, for example, glycerol, ethanolamine or diethylene glycol alone, as described in U.S. Patent No. 2,937,156, or dimethyl formamide or 1,4- butanediol, complete coagulation occurs under the conditions used in the process of the invention.

The dispersing agent or emulsifier, advantageously p-octyl-phenol-polyglycol ether and p-nonyl-phenol-polyglycol ether, or the sodium salt of sulfonic acid of saturated aliphatic hydrocarbons with 12 to 16 carbon atoms obtained by the Fischer-Tropsch-synthesis, or sodium lauryl sulfate, is used in an amount within the range of 3 to 25% by weight, advantageously 10 to 25% by weight, calculated on the solid substance, when formamide is used as the continuous phase; and in an amount within the range of 15 to 25% by weight, advantageously 20 to 25% by weight, calculated on the solid substance, when the formamide-containing solvents are used.

Evaporation in vacuo may be carried out in a simple vessel provided with a stirrer and made of glass, enamel or any other material that does not favor coagulation. Evaporation is carried out while stirring slowly. Alternatively, other devices and apparatus such as thin layer evaporators or rotary evaporators may be used for the evaporation in vacuo. Advantageously, a vacuum evaporation apparatus with circulation heating is used. In accordance with the invention there may be used non-ionic or anionic dispersing agents, either alone or in admixture with one another. Contrary to U.S. Patent 2,937,156 in which the mixture of dispersion and solvent is passed several times in the form of a thin film through a vacuum tube or to the known method of slowly evaporating the water at room temperature from the dispersion which has been poured out to form a thin layer, the process of the invention enables organosols to be obtained in a simple convenient manner in a single process step.

The final concentration of the organosols of the invention may be up to 75% by weight of solid substance. Dispersions of higher final concentration can, on principle, also be obtained, they are, however, difficult to handle as they do not flow well enough and are difficult to stir.

Besides organosols of polytetrafluoroethylene advantageously obtained by the process of the invention, it is also possible to make organosols of fluorine-containing copolymers, for example, of tetrafluoroethylene and 1,1-difluroethylene, or tetrafluoroethylene and ethylene, or tetrafluoroethylene and trifluorochloroethylene, or tetrafluoroethylene and vinyl acetate, or of polyvinyl chloride or polyethylene.

The organosols in accordance with the invention may be used for casting films or impregnating paper, textiles and other materials, particularly if the materials to be coated are sensitive to water.

Also, the dispersions of the invention can be incorporated with special advantage into lacquers and varnishes because of their extremely low water content.

The following examples serve to illustrate the invention, but are not intended to limit it. The percentages are by weight.

EXAMPLE 1

200 grams of an aqueous dispersion of polytetrafluoroethylene having a solid content of 60% and containing 5%, calculated on the solid content, of p-nonyl-phenol-polyglycol ether were mixed with 70 grams of formamide, and the water was substantially completely evaporated from the mixture under a reduced pressure of less than 1 millimeter, finally 0.3 millimeter, of mercury, at a temperature of 55 to 65° C., while stirring slowly.

The dispersion so obtained had a water content of 0.16% and contained 61% of polytetrafluoroethylene, 3% of p-nonyl-phenol-polyglycol ether (5%, calculated on the solid substance) and 36% of formamide.

EXAMPLE 2

In a manner analogous to Example 1, a mixture of 210 grams of a 22.8% dispersion of polytetrafluoroethylene, 8 grams of the sodium salt of sulfonic acid of saturated aliphatic hydrocarbons with 12 to 16 carbon atoms obtained in the Fischer-Tropsch synthesis and 176 grams of formamide was freed from water in vacuo to obtain a dispersion of 20.7% of polytetrafluoroethylene, 3.45% of the sodium salt of sulfonic acid of saturated aliphatic hydrocarbons with 12 to 16 carbon atoms obtained in the Fischer-Tropsch synthesis (16.7%, calculated on solid substance) and 75.8% of formamide. The water content of the dispersion so obtained was 0.25%.

EXAMPLE 3

A mixture of 140 grams of a 22.8% aqueous dispersion of polytetrafluoroethylene, 0.6 gram of sodium lauryl sulfate and 100 grams of formamide was freed from water by evaporation in vacuo as described in Example 1 to obtain a dispersion containing 11% of polytetrafluoroethylene, 0.38% of sodium lauryl sulfate (3.45%, calculated on solid substance) and 88.5% of formamide. The dispersion had a water content of 0.2%.

EXAMPLE 4

A mixture of 300 grams of a 60% aqueous dispersion of polytetrafluoroethylene containing 5% of p-nonyl-phenol-polyglycol ether, 9 grams of p-nonyl-phenol-polyglycol ether and 60 grams of formamide was treated as described in Example 1. A thick fluid dispersion containing 70% of polytetrafluoroethylene, 7% of p-nonyl-phenol-polyglycol ether (10%, calculated on solid substance) and 23% of formamide and having a water content of 0.1% was obtained.

Comparison example

Mixtures of 79 grams of a 60% aqueous dispersion of polytetrafluoroethylene containing 5% of p-nonyl-phenol-polyglycol ether, 8 grams of p-nonyl-phenol-polyglycol ether and 175 grams of glycerol in one experiment, 175 grams of diethylene glycol in another experiment, 175 grams of 1,4-butanediol in a third experiment and 175 grams of ethanolamine in a fourth experiment, were freed from water by evaporating the water in vacuo under conditions analogous to those described in Examples 1 to 4. In all of the experiments the polytetrafluoroethylene coagulated completely.

EXAMPLE 5

In a manner analogous to that described in Examples 1 to 4, a mixture of 39.5 grams of a 60% aqueous dispersion of polytetrafluoroethylene containing 5%, calculated on solid substance, of p-nonyl-phenol-polyglycol ether, with 4 grams of p-nonyl-phenol-polyglycol ether and 87.5 grams of a solvent consisting of 20% of formamide and 80% of glycerol, was freed from water to obtain a stable dispersion of polytetrafluoroethylene containing 20.6% of solid substance, 4.47% of p-nonyl-phenol-polyglycol ether, 15% of formamide and 60% of glycerol. The dispersion contained 0.21% of water.

EXAMPLES 6 AND 7

When, instead of the solvent mixture of Example 5, a mixture of 30% of formamide and 70% of ethanolamine was used in one instance and a mixture of 30% of formamide and 70% of diethylene glycol was used in another instance, substantially anhydrous dispersions of polytetrafluoroethylene having a water content of 0.08% and 0.26%, respectively, were obtained.

EXAMPLE 8

200 grams of a 12.4% aqueous dispersion of a copolymer of about 90% of tetrafluoroethylene and 10% of 1,1-difluoroethylene were mixed with 1.5 grams of sodium lauryl sulfate and 138.7 grams of formamide and the water was distilled off in vacuo. A dispersion containing 15% of copolymer, 0.91% of sodium lauryl sulfate (6%, calculated on solid substance) and 84% of formamide and which had a water content of 0.15% was obtained.

EXAMPLE 9

A mixture of 100 grams of a polyethylene dispersion having a solid content of 43.5%, 2.2 grams of p-nonyl-phenol-polyglycol ether and 128.3 grams of formamide was freed from water in vacuo to obtain a dispersion containing 25% of polyethylene, 1.27% of p-nonyl-phenol-polyglycol ether (5%, calculated on solid substance) and 73.8% of formamide and which had a water content of 0.21%.

What is claimed is:

1. A stable, fluid, colloidal dispersion consisting essentially of (1) a dispersed phase in the amount of 1—70 percent by weight of said dispersion and comprising a polymeric organic compound of high molecular weight insoluble in the liquid continuous phase, said polymer being selected from polytetrafluoroethylene, polyvinyl chloride, polyethylene and copolymers of tetrafluoroethylene with a fluorine-containing comonomer or with vinyl acetate, and (2) a liquid continuous phase in the amount of 99–30 percent by weight of said dispersion and consisting essentially of (a) at most 0.5 percent by weight of said dispersion of water, (b) formamide either alone or in admixture with an alcohol, an ether or an amine, said alcohol, ether or amine having an atmospheric pressure boiling point of 150 to 350° C., said admixture having a formamide content of at least 20 percent by weight, and (c) 3–25 percent by weight of said dispersed polymeric organic compound of a nonionic or anionic surface-active organic compound as dispersing agent, said surface-active organic compound being soluble in water and in the liquid organic continuous phase.

2. The dispersion of claim 1 wherein the dispersed polymeric organic compound of high molecular weight is polytetrafluoroethylene.

3. The dispersion of claim 1 wherein component (b) of the liquid continuous phase consists of a mixture of at least 20 percent by weight of formamide and at most 80 percent by weight of ethylene glycol, ethanolamine or diethylene glycol.

4. The dispersion of claim 1 wherein the surface-active organic compound used as dispersing agent is an alkyl phenyl monoether of a polyglycol.

5. The dispersion of claim 1 wherein the surface-active organic compound used as dispersing agent is polyethylene glycol mono-p-nonylphenyl ether.

6. A process for the manufacture of a stable, fluid, colloidal dispersion of a polymeric organic compound of high molecular weight in an organic liquid in which the polymeric organic compound is insoluble, said polymer being selected from polytetrafluoroethylene, polyvinyl chloride, polyethylene and copolymers of tetrafluoroethylene with a fluorine-containing comonomer or with vinyl acetate, which comprises adding to an aqueous colloidal dispersion of said polymer (a) as an organic liquid, formamide either alone or in admixture with an alcohol, an ether or an amine, said alcohol, ether or amine having an atmospheric pressure boiling point of 150 to 350° C. and (b) a nonionic or an anionic surface-active organic compound soluble in water and in said organic liquid, and evaporating water in vacuo from the mixture until the dispersion obtained contains no more than 0.5 percent by weight of water besides the organic liquid, the quantities of polymer and dispersing agent used being such that the product dispersion contains 1 to 70% by weight of said polymer and 3 to 25% by weight, based on the weight of polymer, of said dispersing agent.

7. The process of claim 6 wherein the polymeric organic compound of high molecular weight is polytetrafluoroethylene.

8. The process of claim 6 wherein the surface-active organic compound is polyethylene glycol mono p-nonylphenyl ether.

References Cited

UNITED STATES PATENTS

| | | | |
|---|---|---|---|
| 2,937,156 | 5/1960 | Berry | 260—34.2 |
| 3,093,611 | 6/1963 | Thomas | 260—32.6 |
| 3,215,663 | 11/1965 | Weisberg | 260—32.6 |
| 3,331,801 | 6/1967 | Osmond et al. | 260—32.6 |

ALLAN LIEBERMAN, *Primary Examiner.*

U.S. Cl. X.R.

260—33.2, 33.4, 29.6, 34.2